US012621063B2

(12) United States Patent
Gorjidooz et al.

(10) Patent No.: US 12,621,063 B2
(45) Date of Patent: May 5, 2026

(54) SYSTEMS AND METHODS FOR FLEXIBLE TIME BASED WAVEFORM SYNTHESIS

(71) Applicant: CACI, INC.—FEDERAL, Reston, VA (US)

(72) Inventors: Bahman Gorjidooz, Aurora, CO (US); Bradley J. Ramsey, Aurora, CO (US); Jeremy Dean Warriner, Longmont, CO (US)

(73) Assignee: CACI, Inc.—Federal, Reston, VA (US)

( * ) Notice: Subject to any disclaimer, the term of this patent is extended or adjusted under 35 U.S.C. 154(b) by 331 days.

(21) Appl. No.: 18/451,478

(22) Filed: Aug. 17, 2023

(65) Prior Publication Data

US 2024/0142631 A1 May 2, 2024

Related U.S. Application Data

(60) Provisional application No. 63/420,866, filed on Oct. 31, 2022.

(51) Int. Cl.
  *H04B 17/11* (2015.01)
  *G01S 19/02* (2010.01)
  (Continued)

(52) U.S. Cl.
  CPC .............. *H04B 17/11* (2015.01); *G01S 19/02* (2013.01); *H04B 1/0003* (2013.01); *H04B 17/104* (2015.01); *H04W 56/0045* (2013.01)

(58) Field of Classification Search
  CPC .... H04B 1/0003; H04B 17/104; H04B 17/11; H04W 56/0045
  See application file for complete search history.

(56) References Cited

U.S. PATENT DOCUMENTS 8,948,325 B1   2/2015  Warner et al.
2006/0050772 A1*  3/2006  Shemesh ................ G04R 20/02
                                      375/145

(Continued)

OTHER PUBLICATIONS

"A New Approach for Absolute Calibration of a GNSS Receiver: Use of a Software-Defined Radio (SDR) Technique"; Uhrich et al.; 2022 Joint Conference of the European Frequency and Time Forum and IEEE International Frequency Control Symposium (Eftf/IFCS) | 978-1-6654-9718-3/22 (Year: 2022).*

(Continued)

*Primary Examiner* — Benjamin H Elliott, IV
(74) *Attorney, Agent, or Firm* — BakerHostetler

(57) ABSTRACT

The present application at least describes a method for waveform synthesis. The method may include a step of transmitting a stimulus signal to a software defined radio (SDR) operating in a first state. The method may also include a step of receiving, via the SDR, an output signal based upon the transmitted stimulus signal. The method may also include a step of. determining, based upon the received output signal, a delay state of the SDR from a plurality of predetermined delay states of the SDR. The delay state may be associated with a parameter of the SDR. The parameter may include any one or more of a receive frequency, transmit frequency or bandwidth. The method may further include a step of generating a calibrated signal based upon the determined delay state. The method may even further include a step of sending the calibrated signal to the SDR to adjust a time.

19 Claims, 11 Drawing Sheets

(51) Int. Cl.
  H04B 1/00    (2006.01)
  H04B 17/10    (2015.01)
  H04W 56/00    (2009.01)

(56)         References Cited

U.S. PATENT DOCUMENTS

| | | | | |
|---|---|---|---|---|
| 2012/0229334 | A1* | 9/2012 | Waters | G01S 19/05 |
| | | | | 342/357.42 |
| 2012/0256789 | A1* | 10/2012 | Bull | G01S 5/02216 |
| | | | | 342/450 |
| 2013/0300466 | A1* | 11/2013 | Wilkinson | G04G 7/00 |
| | | | | 327/144 |
| 2016/0099728 | A1* | 4/2016 | Gruninger | H04B 1/0003 |
| | | | | 370/310 |
| 2017/0019235 | A1* | 1/2017 | Brannon | H04L 25/025 |
| 2017/0103204 | A1* | 4/2017 | Mitola, III | G06F 21/74 |
| 2017/0116442 | A1* | 4/2017 | Hines | G01R 15/181 |
| 2017/0195110 | A1* | 7/2017 | Ruffini | H04L 7/0016 |
| 2017/0273054 | A1* | 9/2017 | Beitler | H04W 64/003 |
| 2019/0018145 | A1* | 1/2019 | Roovers | G01S 19/256 |
| 2019/0260490 | A1* | 8/2019 | Lv | H04J 3/067 |
| 2020/0229206 | A1* | 7/2020 | Badic | G05D 1/6445 |
| 2020/0304224 | A1* | 9/2020 | Neugeboren | H04L 43/0858 |
| 2020/0371245 | A1* | 11/2020 | Murphy | G01S 19/30 |
| 2021/0096265 | A1* | 4/2021 | Ilie | G01S 19/23 |
| 2021/0184702 | A1* | 6/2021 | Sandoval | H04L 45/124 |
| 2022/0077877 | A1* | 3/2022 | Payton | H04W 56/0015 |
| 2022/0196776 | A1* | 6/2022 | Wetherbee | G01R 29/0892 |
| 2022/0239541 | A1* | 7/2022 | Moghaddam | H04W 56/001 |
| 2022/0303929 | A1* | 9/2022 | Chowdhury | H03L 7/18 |
| 2023/0164662 | A1* | 5/2023 | Agarwal | H04W 56/0015 |
| | | | | 370/392 |
| 2023/0299843 | A1* | 9/2023 | Boyd | H04B 7/18532 |
| | | | | 455/12.1 |
| 2023/0362844 | A1* | 11/2023 | Ben-Ari | H04W 56/0015 |
| 2024/0103182 | A1* | 3/2024 | Acheson | G01S 19/14 |
| 2024/0142631 | A1* | 5/2024 | Gorjidooz | H04W 56/0045 |
| 2024/0146423 | A1* | 5/2024 | Burgin | H04W 56/0045 |
| 2024/0163819 | A1* | 5/2024 | Fu | H04W 56/0045 |
| 2024/0340818 | A1* | 10/2024 | Marr, Jr. | H04W 56/0015 |
| 2024/0361419 | A1* | 10/2024 | Marr, Jr. | H04Q 9/04 |

OTHER PUBLICATIONS

"An Approach for Implementation of Ranging and Positioning Methods on a Software Defined Radio"; Sark et al.; 2017 14th Workshop on Positioning, Navigation and Communication (WPNC) (Year: 2017).*

"Thesis: Navigation in GNSS denied environments using software defined radios and LTE signals of opportunities"; Ikhtiari; University of Canterbury, Christchurch, New Zealand. May 19, 2019 (Year: 2016).*

"Software Defined Radio for Small Satellites"; Garyver et al.; 2015 IEEE Aerospace Conference; Jun. 2015 (Year: 2015).*

* cited by examiner

500

700

710

Transmitting a stimulus signal to a software defined radio (SDR) operating in a first state

720

Receiving, via the SDR, an output signal based upon the transmitted stimulus signal

730

Determining, based upon the received output signal, a delay state of the SDR from a plurality of predetermined delay states of the SDR

740

Generating a calibrated signal based upon the determined delay state

750

Sending the calibrated signal to the SDR to adjust a time

FIG. 7

SYSTEMS AND METHODS FOR FLEXIBLE TIME BASED WAVEFORM SYNTHESIS

CROSS-REFERENCE TO RELATED APPLICATION

This application claims priority to U.S. Provisional Application No. 63/420,866, filed Oct. 31, 2022, entitled "Methods and Systems for Controlling Timing Capability," the content of which is incorporated by reference herein in its entirety.

FIELD

This application generally relates to systems and methods for improving waveform synthesis. More specifically, the systems and methods for improving waveform synthesis are employed in the field of Positioning, Navigation, and Timing (PNT) systems.

BACKGROUND

A satellite in orbit typically must maintain certain information about its state in orbit in order to functional properly. Systems that provide or use this type of information may be referred to as PNT systems. Positioning refers to the ability to determine a satellite's location in three dimensions relative to a selected frame of reference, e.g., an Earth-Centered, Earth-Fixed (ECEF) coordinate system.

Navigation refers to the ability to employ positioning information to determine relationships between the position of multiple satellites or between positions of one satellite at various times. Timing refers to the ability to determine a satellite's time relative to a selected time reference. For example, this may be a clock offset between the satellite's local clock and Coordinated Universal Time (UTC). Timing may also include time transfer, which is the capability to transfer local knowledge of time from one location or system to another.

PNT systems require a high degrees of synchronization accuracy. However, conventional PNT systems exhibit non-deterministic radio frequency (RF) characteristics causing fluctuations in synchronization analysis and normal routines. In additional, conventional PNT systems employing GPS are generally unencrypted and exhibit low power. GPS related satellite architectures are therefore more susceptible to disruption caused by jamming, spoofing or on-orbit attacks.

What is desired in the art are architectures and techniques configured to generate signals with tightly controlled RF characteristics.

What is also desired in the art are architectures and techniques that tightly control analog signal delays to a remote system.

What is further desired in the art are architectures and techniques configured to completely characterize delays in digital signals received from a remote system.

What is even further desired in the art are architectures and techniques offering GPS augmentation and/or replacement options in GPS-denied environments.

SUMMARY

The foregoing needs are met, to a great extent, by the disclosed systems, methods, and techniques described herein.

One aspect of the patent application is directed to a method for waveform synthesis. The method may include a step of transmitting a stimulus (timing) signal to a software defined radio (SDR) operating in a first state. The method may also include a step of receiving, via the SDR, an output signal based upon the transmitted stimulus signal. The method may also include a step of determining, based upon the received output signal, a delay state of the SDR from a plurality of predetermined delay states of the SDR. The delay state may be associated with a parameter of the SDR. The parameter may include any one or more of a receive frequency, transmit frequency or bandwidth. The method may further include a step of generating a calibrated signal based upon the determined delay state. The method may even further include a step of sending the calibrated signal to the SDR to adjust a time.

Another aspect of the application describes a system for waveform synthesis. The system includes a non-transitory memory including instructions stored thereon. The system also includes a processor operably coupled to the non-transitory memory configured to execute a set of the instructions. One of the instructions may include causing a transmission of a stimulus (timing) signal to a software defined radio (SDR) operating in a first state. Another one of the instructions may include causing a reception of an output signal from the SDR based upon the transmitted stimulus signal. Yet another one of the instructions may include determining, based upon the received output, a delay state of the SDR from a plurality of predetermined delay states of the SDR. The delay state may be associated with a parameter of the SDR. A further one of the instructions may include causing to generate a calibrated signal based upon the determined delay state.

There has thus been outlined, rather broadly, certain embodiments of the application in order that the detailed description thereof herein may be better understood, and in order that the present contribution to the art may be better appreciated. There are, of course, additional embodiments of the application that will be described below and which will form the subject matter of the claims appended hereto.

BRIEF DESCRIPTION OF THE DRAWINGS

To facilitate a fuller understanding of the application, reference is made to the accompanying drawings, in which like elements are referenced with like numerals. These drawings should not be construed to limit the application and are intended only for illustrative purposes.

FIG. 7 illustrates an example method according to an aspect of the application.

DETAILED DESCRIPTION

Figures 1A, 1B:
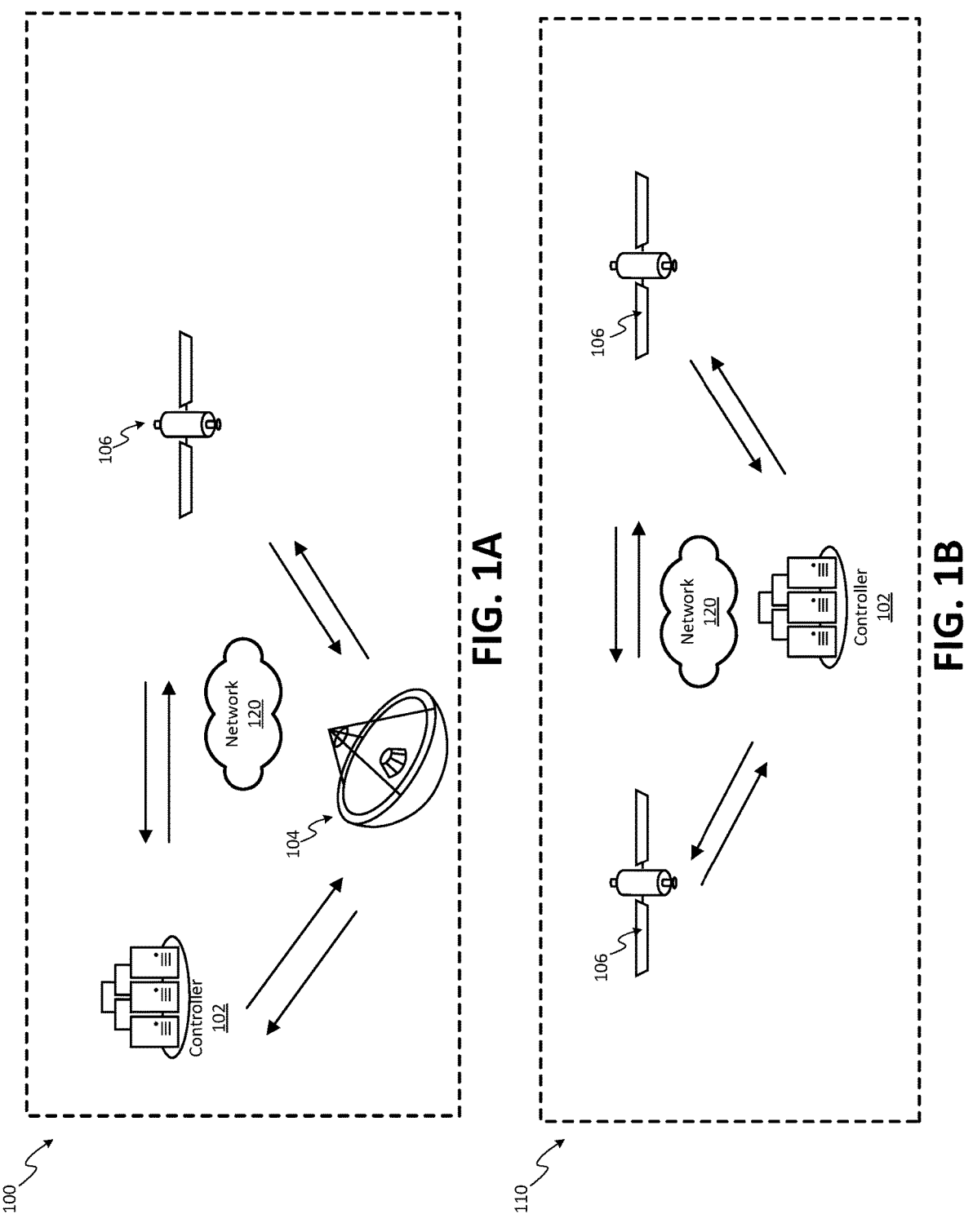
FIGS. 1A and 1B illustrate block diagrams of example systems according to an aspect of the application.

Before explaining at least one embodiment of the application in detail, it is to be understood that the application is not limited in its application to the details of construction and to the arrangements of the components set forth in the following description or illustrated in the drawings. The application is capable of embodiments in addition to those described and of being practiced and conducted in various ways. Also, it is to be understood that the phraseology and terminology employed herein, as well as the abstract, are for the purpose of description and should not be regarded as limiting.

Reference in this application to "an aspect," "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not for other embodiments.

In accordance with one or more aspects, the present application describes a novel approach to waveform synthesis. In an example embodiment, waveform synthesis is employed in the field of PNT systems. More specifically, the PNT systems may include low earth orbit (LEO), medium earth orbit (MEO) and high earth orbit (HEO) satellites.

It is also envisaged according to the present application that the architectures and techniques may be employed to many other industries where SDRs are employed. For example, these may include but are not limited to the fields of radiofrequency sensors, medical treatment, weaponry and financial trading systems.

In an embodiment, waveform synthesis techniques may help improve one or more characteristics of radio frequency (RF) signal generation and transmission to a remote system. In an example, the remote system may include a reprogrammable SDR. In an example, characteristics of the generated RF signals may be controlled with respect to an absolute transmit time and a phase. The absolute transmit time may be dynamically controlled at a complex baseband sample level. This approach may adjust a time of the SDR with enhanced accuracy. In an embodiment, the timing accuracy may be on the level of sub-nanoseconds, e.g., picoseconds.

In addition, the novel architecture and technique support time-aligned communication protocols where a priori knowledge of UTC is required for generation and/or acquisition. As will be shown in the application, the described approaches and techniques are highly valuable in the context of satellite-related applications employing SDRs.

According to an aspect, the architecture may be used to produce signals that are corrected for transmitter motion dynamics. In so doing, signal observables such as for example doppler, phase, delay, are identical to a signal transmitted from a pre-determined focus point.

In some aspects, timing adjustments may be performed via techniques at the real-time logic (RTL) level or the software level of a remote system. In an example use case, the remote system may include but are not limited to orbiting satellites or ground stations.

It is envisaged according to the present application that the techniques may improve non-deterministic RF behavior. This may be achieved by using common timing signals such as global navigation satellite system (GNSS) waveforms. Other specialized communication protocols may also be used and is limited only by the available bandwidth of the hardware.

In accordance with one or more other aspects, the present application describes novel architectures and techniques configured to control a delay of a transmitted signal to a remote system. According to an embodiment, the transmitted signal may include a calibrated analog signal.

In accordance with one or more other aspects, the present application describes architectures and techniques that may characterize delays in received digital signals at a first system and where a calibrated signal is transmitted to a second system. More specifically, parameters of a reprogrammable SDR may be utilized to characterize the signal delay. For example, the parameter(s) may include any one or more of a received frequency, transmit frequency or bandwidth.

In an embodiment, it is envisaged that any reprogrammable SDR hardware may be quickly characterized for time-based uses by a first system. The calibration process may be configured to isolate signal processing code from the hardware implementation. In so doing, the algorithm may be useful in one or more future implementations.

In accordance with one or more further aspects, the present application describes architectures and techniques offering GPS augmentation and/or replacement in GPS-denied environments. These techniques provide advanced and resilient time synchronization which may improve navigation and systems performance.

System Architecture

According to an exemplary embodiment, FIGS. 1A and 1B illustrate systems 100, 110, respectively, in which one or more disclosed embodiments may be implemented. The system 100 in FIG. 1A may include a controller 102 (e.g., processor) communicatively connected via a network 120 to one or more nodes. As will be described with respect to FIG. 4, controller 102 may be operably coupled to one or more of a clock/calibration module and signal generator. As depicted in FIG. 1A, one of the nodes may include a ground station 104. Another one of the nodes may include a satellite 106. The satellite may be a LEO, MEO or HEO satellite. While not shown, system 100 may include additional nodes such as for example another ground station or satellite.

The controller 102, generally speaking, may coordinate the activities and data exchanges between one or more nodes. In an embodiment, the controller 102 may be integrated with one of the nodes in the system. In an example embodiment, the controller may be integrated within the ground station 104 to form a single unit. Alternatively, the controller 102 may be located remote from the illustrated nodes.

The system 110 in FIG. 1B operates in a similar fashion as system 100 in FIG. 1A. Similar reference indicators will be preserved among both FIG. 1A and FIG. 1B. Instead of a ground station communicating with a satellite as depicted in FIG. 1A, FIG. 1B illustrates two satellites 106 in communication with each other and with a controller 102. It is envisaged that both satellites 106 could be ground stations in an embodiment.

Figure 2:
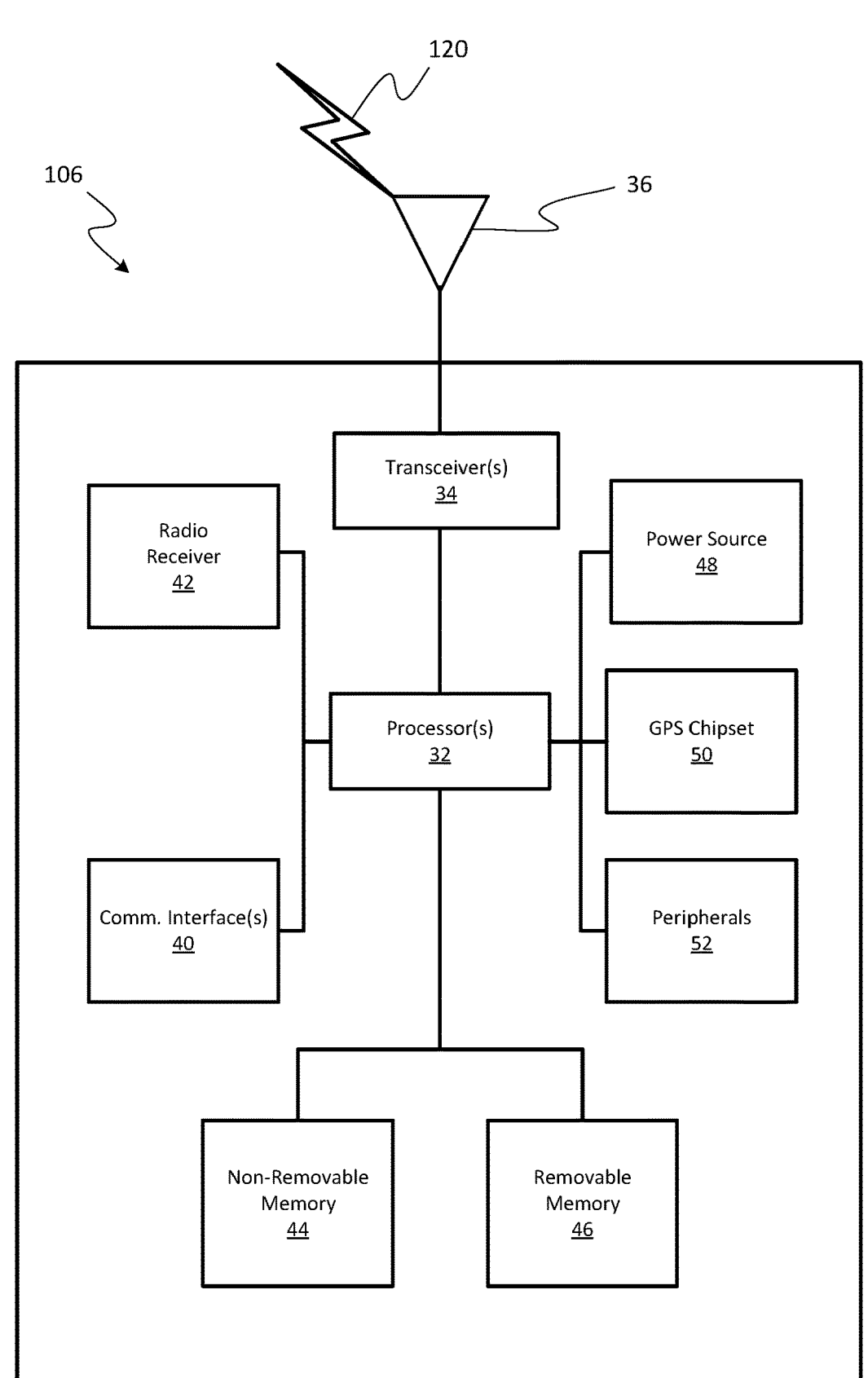
FIG. 2 illustrates an example equipment device according to an aspect of the application.

FIG. 2 is a block diagram of an exemplary hardware/ software architecture of a node in a system of FIG. 1. As shown in FIG. 2, the node may be a satellite 106 or alternatively, a ground station 104. The node 106 may include one or more processors 32, a communication interface 40, a radio receiver 42, non-removable memory 44, removable memory 46, a power source 48, a global positioning system (GPS) chipset 50, and other peripherals 52. The node 106 may also include communication circuitry, such as one or more transceivers 34 and a transmit/receive element 36. It will be appreciated that node 106 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., the non-removable memory 44 and/or the memory 46) of the node 106 in order to perform its various required functions.

The processor 32 is coupled to its communication circuitry (e.g., the transceiver 34, the transmit/receive element 36, the radio receiver 42, and the communication interface 40). The processor 32, through the execution of computer executable instructions, may control the communication circuitry in order to cause the node 106 to communicate with other components of the system. In an example, node 106 may be a satellite system which communicates with a ground station 104 and/or controller 102. The processor 32 may further control the communication circuitry to detect and capture radio spectrum and radio signal data via the transmit/receive element 36 and the radio receiver 42. The radio receiver 42 may comprise a software-defined radio (SDR) receiver. The radio receiver 42 may define one or more channels, such as one or more channels to scan a frequency spectrum for any radio signals associated with a primary user and one or more channels to capture identified radio signal data associated with a primary user.

The transmit/receive element 36 may be configured to receive (i.e., detect) a primary signal (e.g., from a ground station or another satellite) in the node's 106 RF environment. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals.

It will be appreciated that the transmit/receive element 36 may be configured to transmit and/or receive any combination of wireless or wired signals. The transceiver 34 and/or transmit/receive element 36 may be integrated with, in whole or in part, the communication interface(s) 40, particularly wherein a communication interface 40 comprises a wireless communication interface.

The processor 32 may access information from, and store data in, any type of suitable memory, such as the non-removable memory 44 and/or the removable memory 46. For example, the processor 32 may store captured radio signal data (e.g., FA packets and digital I&Q data) in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a USB drive, a secure digital (SD) memory card, and the like. In other embodiments, the processor 32 may access information from, and store data in, memory that is not physically located on the node 106. The non-removable memory 44, the removable memory 46, and/or other associated memory may comprise a non-transitory computer-readable medium configured to store instructions that, when executed, effectuate any of the various operations described herein.

The processor 32 may receive power from the power source 48 and may be configured to distribute and/or control the power to the other components in the node 106. The power source 48 may be any suitable device for powering the node 106. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The power source 48 may be additionally or alternatively configured to receive power from an external power source.

Figure 3:
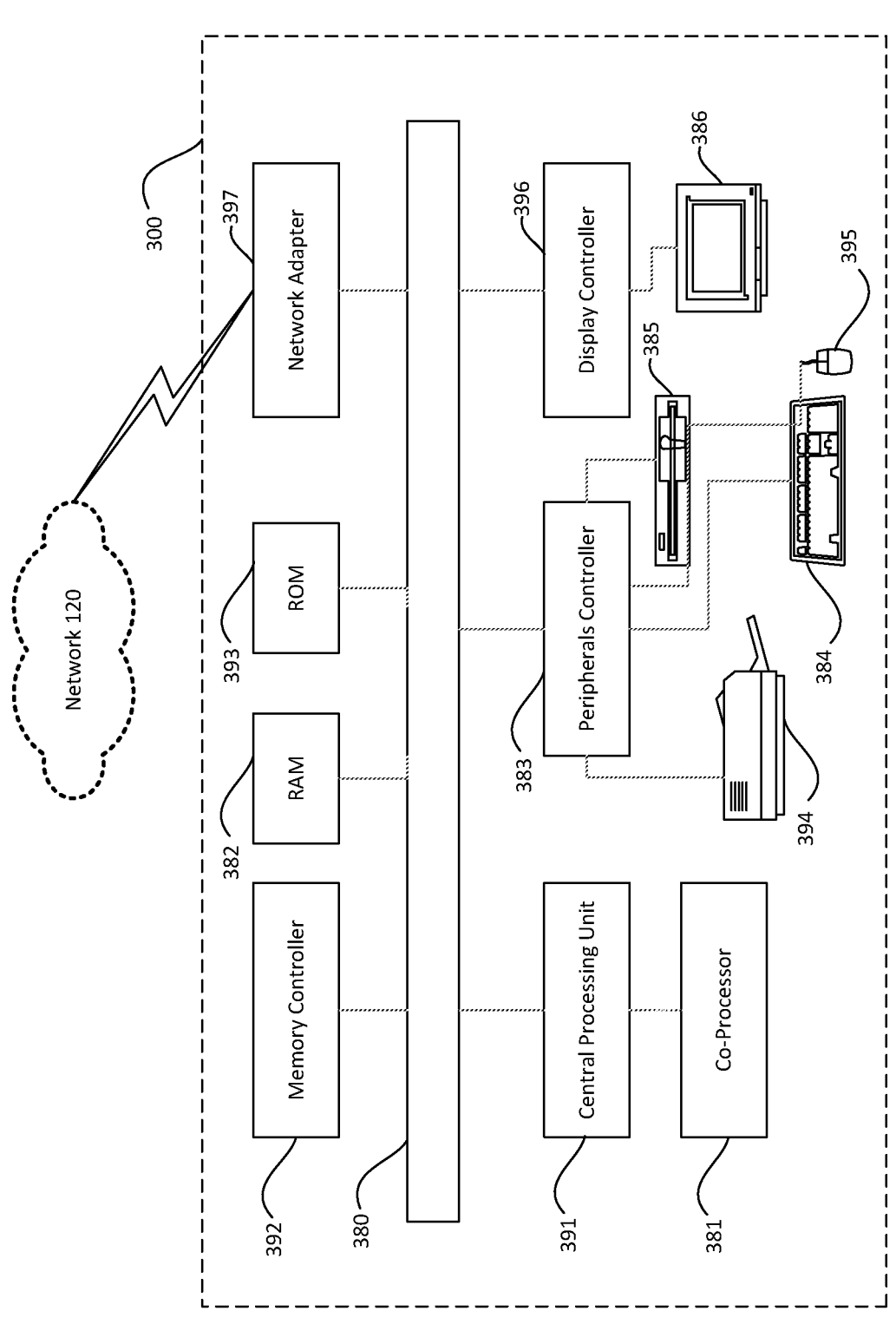
FIG. 3 illustrates a block diagram of an example computing system according to an aspect of the application.

FIG. 3 depicts a block diagram of an exemplary computing system 300 which may be used coordinate with one or more components of the system, including node 106, ground station 104, and/or controller 102 depicted in FIG. 1A or 1B. In one or more embodiments, the computing system may be, or form port of, controller 102. The computing system 300 may comprise a computer or server and may be controlled primarily by computer-readable instructions (e.g., stored on a non-transitory computer-readable medium), which may be in the form of software, wherever, or by whatever means such software is stored or accessed. Such computer-readable instructions may be executed within a processor, such as a central processing unit (CPU) 391, to cause the computing system 300 to do work. In many known workstations, servers, and personal computers, the CPU 391 is implemented by a single-chip CPU called a microprocessor. In other machines, the CPU 391 may comprise multiple processors. A coprocessor 381 is an optional processor, distinct from the CPU 391 that performs additional functions or assists the CPU 391. The CPU 391 and/or the coprocessor 381 may receive anomaly detection data from a node 106 to detect a primary signal in the node's 106 RF environment.

In operation, the CPU 391 fetches, decodes, executes instructions, and transfers information to and from other resources via the computer's main data-transfer path, system bus 380. Such a system bus connects the components in the computing system 300 and defines the medium for data exchange. The system bus 380 typically includes data lines for sending data, address lines for sending addresses, and control lines for sending interrupts and for operating the system bus 380. An example of such a system bus 380 may be the PCI (Peripheral Component Interconnect) bus or PCI Express (PCIe) bus.

Memories coupled to the system bus 380 include random access memory (RAM) 382 and read only memory (ROM) 393. Such memories include circuitry that allows information to be stored and retrieved. The RAM 382, the ROM 393, or other associated memory may comprise a non-transitory computer-readable medium configured to store instructions that, when executed, effectuate any of the various operations described herein. The ROMs 393 contain stored data that cannot easily be modified. Data stored in the RAM 382 may be read or changed by the CPU 391 or other hardware devices. Access to the RAM 382 and/or the ROM 393 may be operated by a memory controller 392. The memory controller 392 may provide an address translation function that translates virtual addresses into physical addresses as instructions are executed. The memory controller 392 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, the computing system 300 may comprise a peripherals controller 383 responsible for communicating instructions from the CPU 391 to peripherals, such as a printer 394, a keyboard 384, a mouse 395, and a disk drive 385. A display 386, which is controlled by a display controller 396, is used to display visual output generated by the computing system 300. Such visual output may include text, graphics, animated graphics, and video. Visual output may further comprise a GUI. The display 386 may be implemented with a CRT-based video display, an LCD-based flat-panel display, gas plasma-based flat-panel display, or a touch-panel. The display controller 396 includes electronic components required to generate a video signal that is sent to the display 386.

Further, the computing system 300 may comprise communication circuitry, such as a network adaptor 397, that may be used to connect the computing system 300 to a communications network, such as the network 120 of FIG. 1A or 1B, to enable the computing system 300 to communicate with other components of the system and network.

Figure 4:
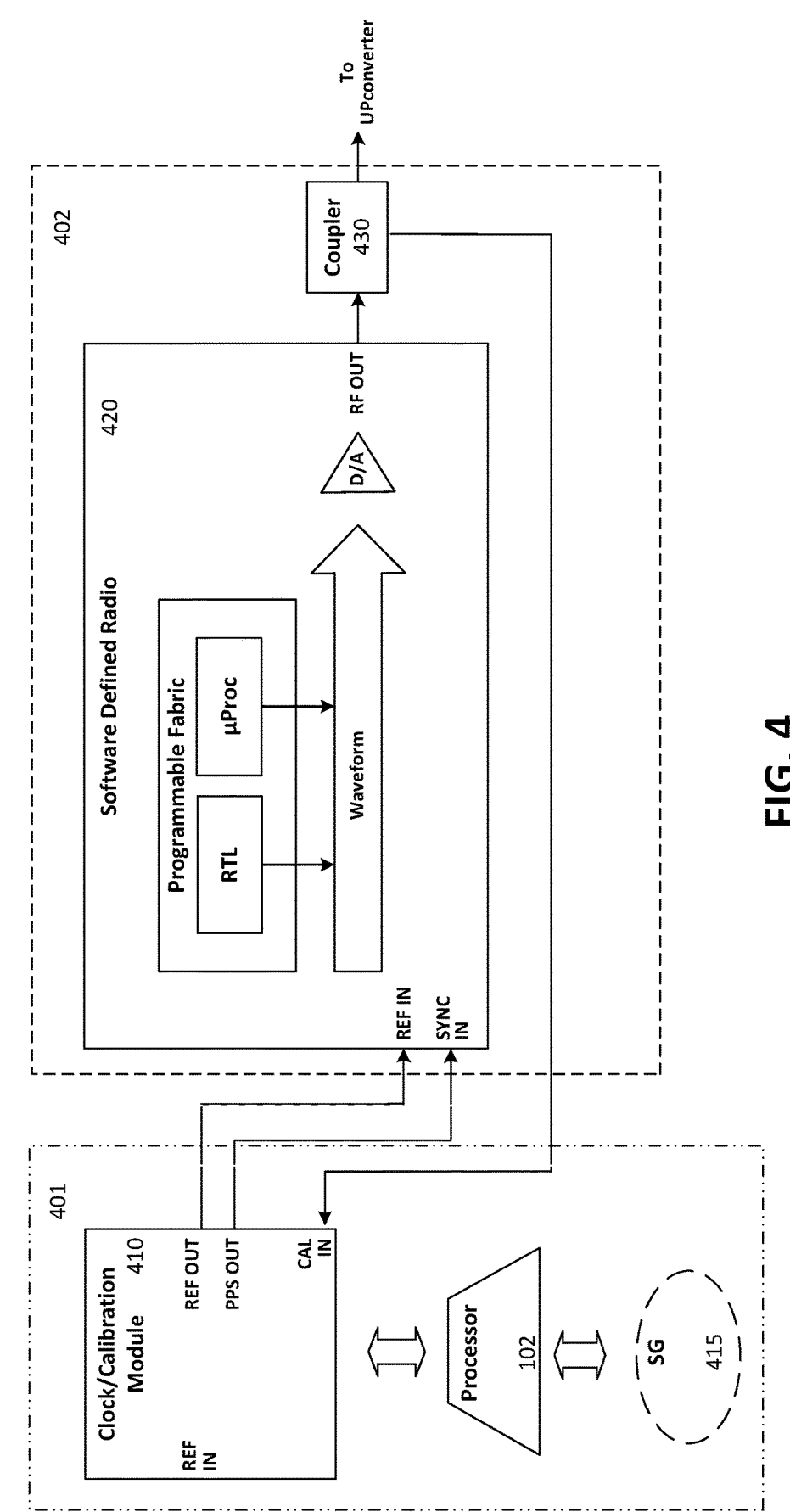
FIG. 4 illustrates an example architecture of a local system communicating with a remote system according to an aspect of the application.

According to an another aspect of the present application, FIG. 4 depicts an example architecture 400 including a local system 401 and a remote system 402. System 401 is represented by a dotted box. System 401 may include a clock/calibration module 410, signal generator 415 and a processor 102. It is envisaged according to the instant application that each of the above mentioned components in the local system could be housed in a single unit, or alternatively, operably coupled to one another as separate units.

Local system 401 communicates with remote system 402 via RF signals. Remote system 402 is represented by another dotted line. System 402 may include SDR 420 and a coupler 430. It is understood within the present application that waveform features may be implemented in any one or more of FPGA Realtime Logic (RTL), high-level microprocessor code, or in a fixed memory buffer. High-precision dynamic time alignment may also be digitally implemented.

According to an embodiment as depicted in FIG. 4, clock/calibration module 401 transmits a reference out (REF OUT) signal and PPS out signal to the SDR 420 located at the remote system 402. SDR 420 may receive these signals at a reference in (REF IN) and sync in (SYNC IN) terminals. Signals processed by SDR 420 may be output via RF OUT to a coupler 430. The coupler 430 may transmit signals to an input terminal of the clock/calibration module 410 represented by CAL IN. In an embodiment, the signals received by coupler 430 may be transmitted to an upconverter for processing as an intermediary step.

According to another embodiment of this aspect, system 401 may be configured to transmit a stimulus, e.g., timing, signal to SDR 420. SDR 420 may be operating in a first state.

The stimulus signal may include any one or more of a radio frequency signal or a pulse per second (PPS) signal. In an embodiment, the stimulus signal may include a GNSS waveform. It is envisaged according to the present application that any waveform may be synchronized by any other time source.

SDR 420 may process the stimulus signal and produce an output signal. SDR 420 may receive this output signal and determine a delay state of SDR 420. The delay state may be determined from plural predetermined delay states of SDR 420. For example, the predetermined delay states may be obtained via collecting a plurality of signals output from SDR 420 over a predefined period of time. The collected signals may be evaluated and characterized for one or more parameters of SDR 420. Further, the characterized parameters may be stored in a library. In an embodiment, stored parameters may be located on a remote cloud server be operably in communication with the processor 102.

In another embodiment, the delay state may be based upon a hardware delay. The delay state may also be associated with a parameter of the SDR as described above. The parameter may include, but is not limited to, any one or more of a receive frequency, transmit frequency or bandwidth. According to an embodiment, the delay state may range between −3.5 ps/° C. 12.5 ps/° C. at a low earth orbit environment.

Based upon the determined delay state by system 401, a calibrated signal is generated via signal generator 415. The calibrated signal may be sent to the remote system 402 via SDR 420 in order to adjust time. In this example, SDR 420 may now operate in a second state. The second operating state of SDR 420 may be different from the first operating state discussed above.

According to a further embodiment, system 401 may receive another output signal from SDR 420 operating in the second state. System 401 may determine another delay state of SDR 420 from the plurality of predetermined delay states. Moreover, system 401 may generate a calibrated signal based upon the second state. The calibrated signal may be a function of an operating temperature of SDR 420. The calibrated signal may also be a sub-nanosecond signal (e.g., picoseconds).

According to yet another embodiment, the calibrated signal may subsequently be transmitted to SDR 420. SDR 420 may then operate in a third state. The third operating state of SDR 420 may be different from the first and second operating states discussed above.

Figure 5:
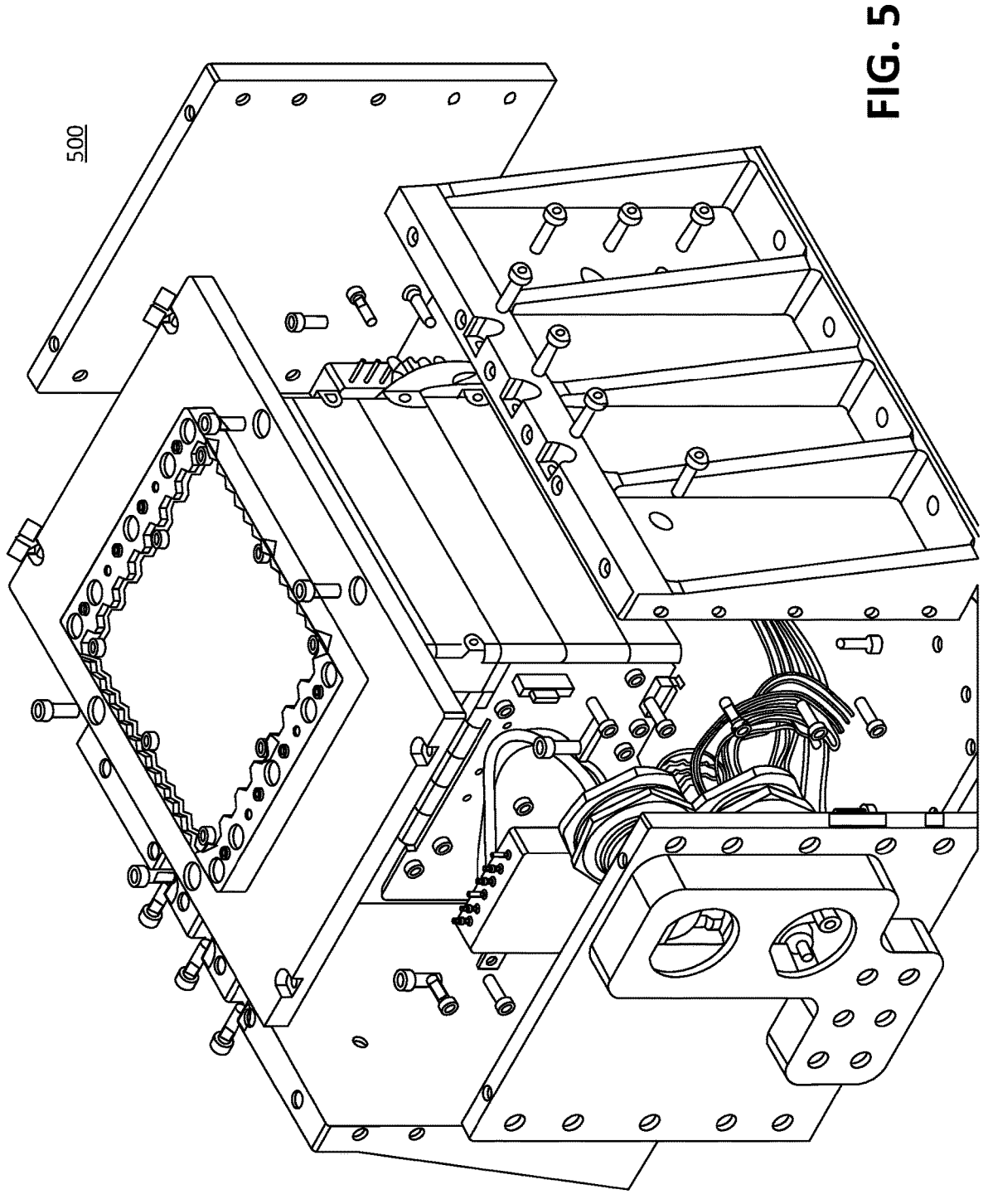
FIG. 5 illustrates an example reprogrammable software defined radio (SDR) schematic according to an aspect of the application.

According to another aspect, FIG. 5 depicts an exemplary reprogrammable SDR 500 used in one or more architectures and techniques of the present application. Generally, SDR 500 allows an adaptable communications platform to change a modulation of signals with software. In an exemplary use case, SDR 500 allows the adaptable communications platform to establish a link with one or more satellites. SDR 500 may allow one adaptable communications platform to switch between the BPSK, QPSK, 8PSK, QAM, CDMA, GSM, and other signal modulation waveforms that various communication devices utilize. In an embodiment, forward error correction (FER), compression, conditional access, and encryption are all achieved with software.

As shown in FIG. 5, reprogrammable SDR 500 may include an EMI filter, RF connection breakouts, power/digital connectors, power supplies, a core payload, and a $K_a$ band APA. Specifically, SDR operates in a $K_a$ band frequency. The $K_a$ band includes frequencies ranging from 27 GHz to 40 GHz. The $K_a$ band may include wavelengths ranging between 1.1 to 0.75 centimeters.

The $K_a$ band is configured to transport high-speed data communication with wide coverage through multiple beams. The $K_a$ band frequency allows the SDR to employ an antenna with a smaller footprint. $K_a$ band frequency may be used in various used cases such as for example those requiring high-resolution, close-range targeting radars, military aircraft, space telescopes, commercial, wireless point-point microwave communication systems, vehicle speed detection systems, and satellite communications.

Figure 6A:
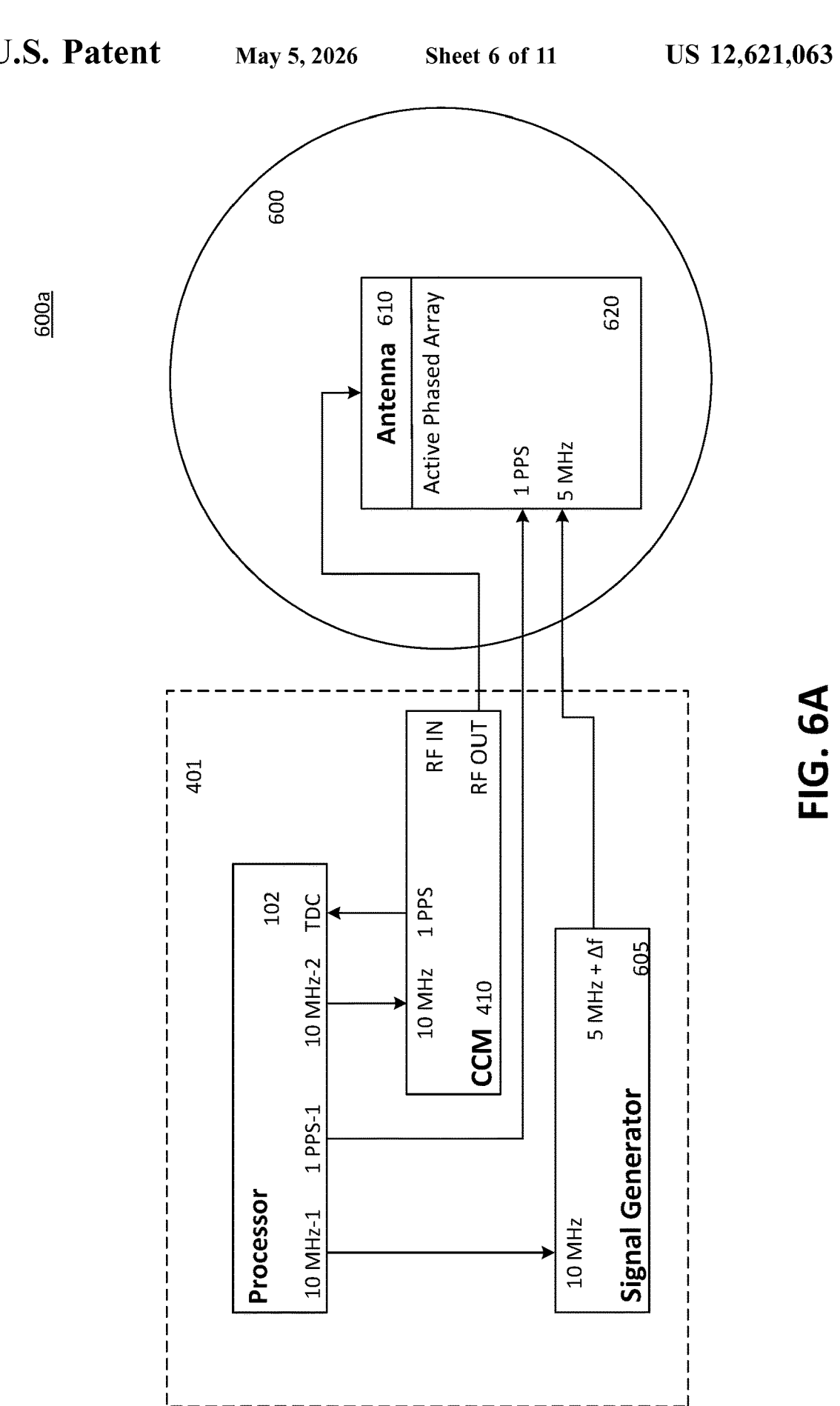
FIG. 6A illustrates an example implementation of the architecture according to an aspect of the application.

According to another aspect of the present application, FIG. 6A depicts an exemplary implementation 600a. Here, system 401 transmits a signal to SDR 620. The signal is received via antenna 610 of SDR 620. SDR 620 may be housed in a sealed environment 600. In an embodiment, the sealed environment 600 may be configured as a thermal vacuum chamber. The thermal vacuum chamber may operate at temperatures ranging between 0 and 20° C. (cold and hot dwells) and at a vacuum pressure of less than $10^{-5}$ Torr. In an example, the thermal vacuum chamber may be, or part of, a satellite orbiting in space such as disclosed in FIGS. 1A-B. Alternatively, the thermal operating chamber may be, or part of, a ground station.

According to FIG. 6A, the clock/calibration module 410 transmits a signal on a $K_a$ band via its RF OUT to an SDR 620. The signal may be received via an antenna 610 of SDR 620.

In addition, processor 120 may transmit a 10 MHz-1 signal to a signal generator 605. The signal generator 605 may send a 5 MHz frequency to the SDR 620. The processor 120 may also transmit a 1 PPS-1 signal to the SDR. Processor 120 may also transmit a 10 MHz-2 signal to the clock/calibration module 410. The processor 120 may receive a 1 PPS signal therefrom which is converted to a digital signal via a time-to-digital-convertor (TDC).

Figure 6B:
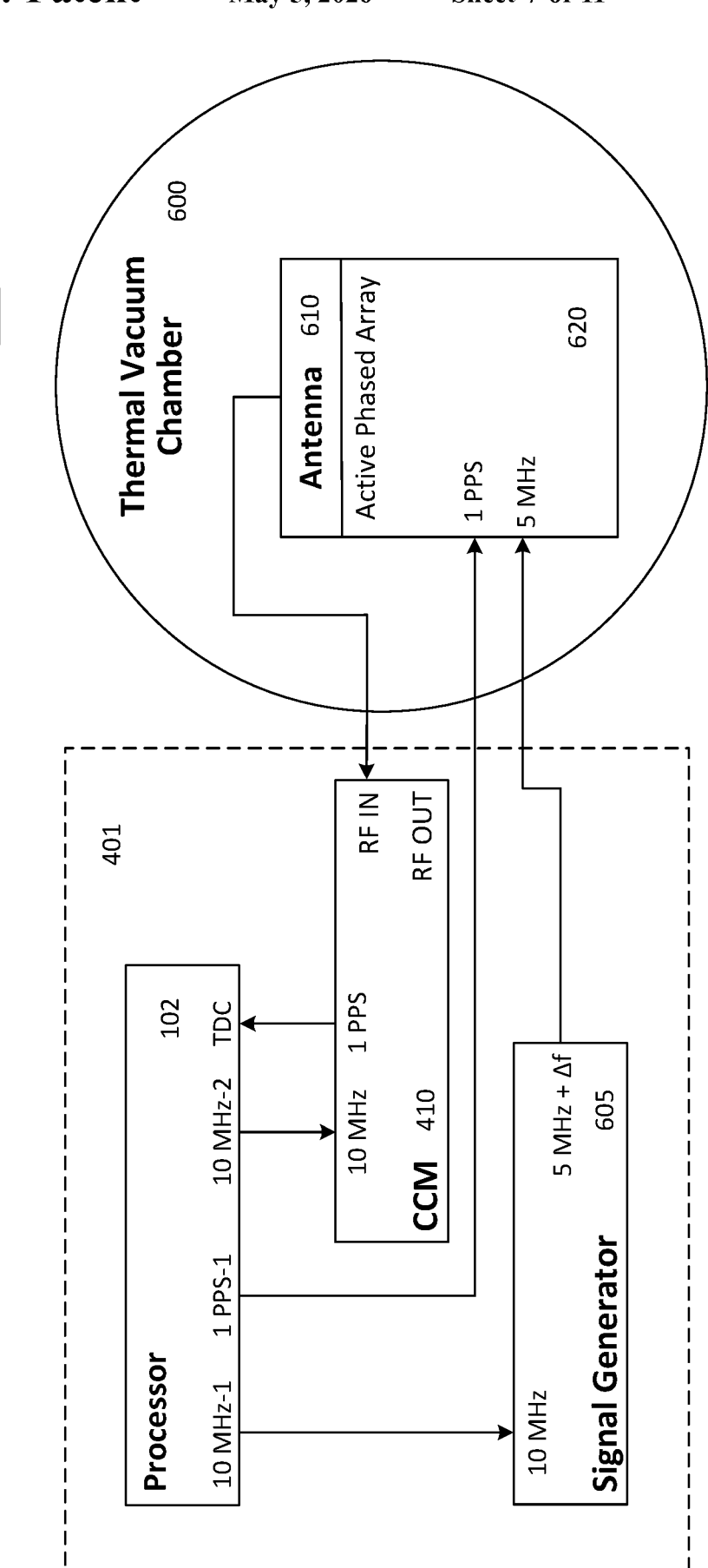
FIG. 6B illustrates an example implementation of the architecture according to an aspect of the application.

According to even another aspect of the present application, FIG. 6B depicts an exemplary implementation 600b of the application. In this aspect, SDR 620 in system 600 may transmit a signal in the $K_a$ band via its antenna 610 to the clock/calibration module 410. System 600 may operate at similar operating temperatures and pressures as described above for FIG. 6A. As described in the present application, the transmitted signal via SDR 620 may be based upon a stimulus/timing signal sent by system 401.

Figure 6C:
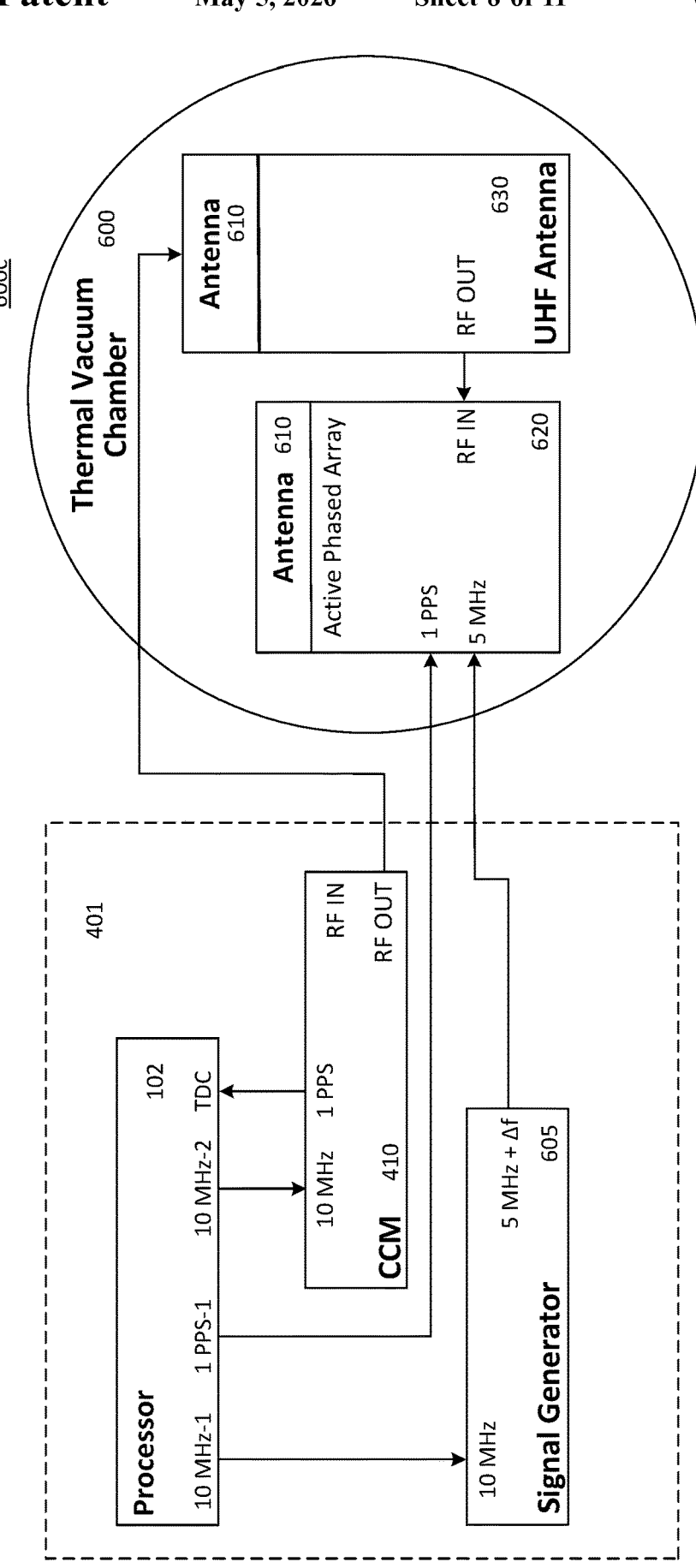
FIG. 6C illustrates an example implementation of the architecture according to an aspect of the application.

According to yet even another aspect of the present application, FIG. 6C depicts an exemplary implementation 600c of the application. Here, SDR 620 may communicate with an ultrahigh frequency (UHF) antenna 630 in system 600. In contrast with FIG. 6A, the signal from the clock/calibration module 410 via RF OUT is transmitted to UHF Antenna 630. UHF antenna 630 transmits the signal via its RF OUT to the SDR 620 via its RF IN. System 600 may operate at similar operating temperatures and pressures as described above with respect to FIG. 6A.

Figure 6D:
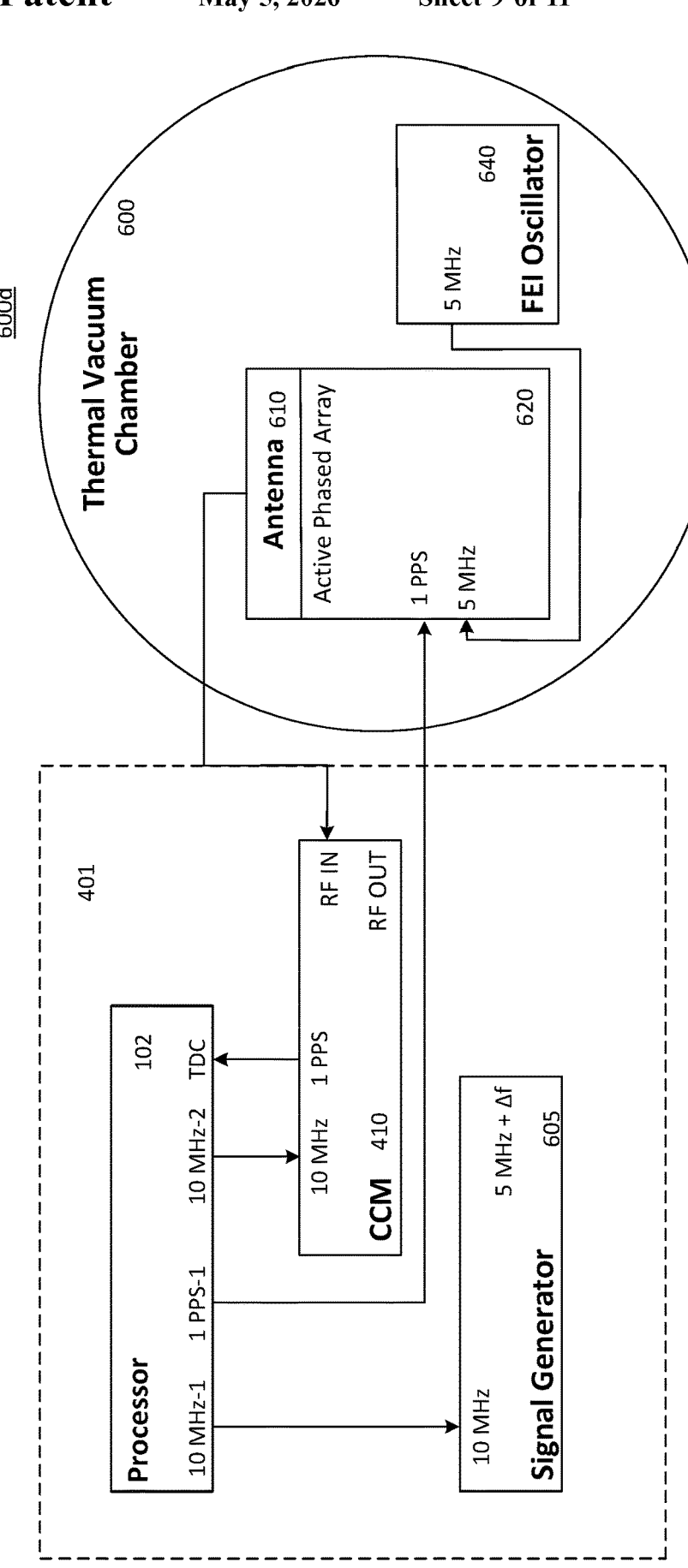
FIG. 6D illustrates an example implementation of the architecture according to an aspect of the application.

According to a further aspect of the present application, FIG. 6D depicts an exemplary implementation 600d of the application. Here, SDR 620 in system 600 may transmit a signal via its antenna 610 to the clock/calibration module 410. The SDR 620 may receive a 1 PPS signal from the processor. System 600 may also include an FEI oscillator 640 which transmits a frequency (e.g., 5 MHz) to SDR 620. System 600 may operate at a temperature ranging between 9 and 13° C. (at cold and hot dwells) and at a vacuum pressure of less than $10^{-5}$ Torr. As described in the present application, any hardware delays may be a function of the system operating temperature.

Figure 6E:
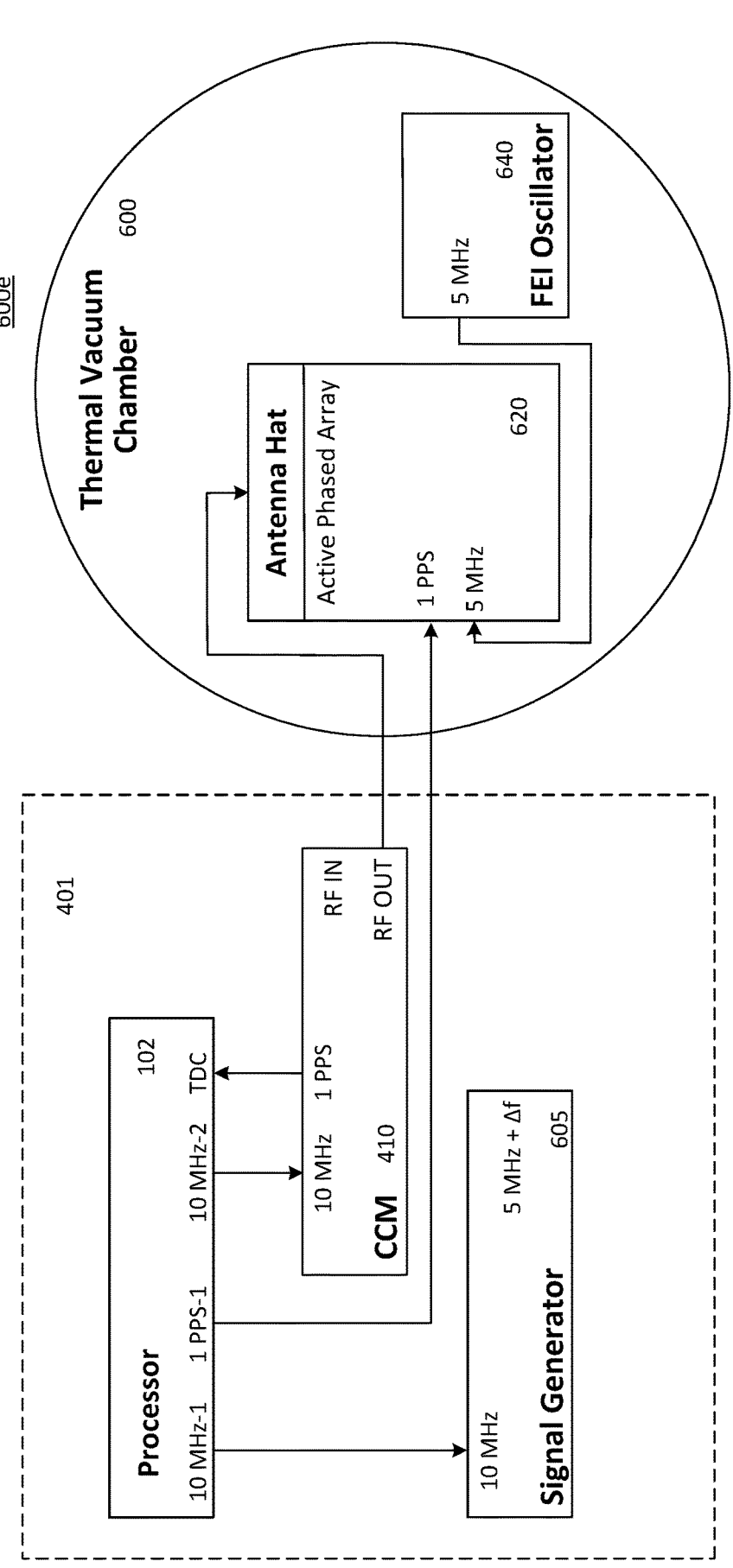
FIG. 6E illustrates an example implementation of the architecture according to an aspect of the application.

According to yet a further aspect of the present application, FIG. 6E depicts an exemplary implementation 600e of the application. The setup is generally similar to that of FIG. 6D. However, the SDR 620 in system 600 may receive a signal via its antenna 610 from the clock/calibration module 410. System 600 may operate at similar operating temperatures and pressures as described above for FIG. 6D.

According to yet even a further aspect of the present application, an exemplary method 700 is described. One of the steps of method 700 may include transmitting a stimulus signal to a software defined radio (SDR) operating in a first state (710). Another one of the steps of method 700 may include receiving, via the SDR, an output signal based upon the transmitted stimulus signal (720). Yet another step of method 700 may include determining, based upon the received output signal, a delay state of the SDR from a plurality of predetermined delay states of the SDR (730). The delay state may be associated with a parameter of the SDR. The parameter may include any one or more of a receive frequency, transmit frequency or bandwidth. A further step of method 700 may include generating a calibrated signal based upon the determined delay state (740). Yet a further step of method 700 may include sending the calibrated signal to the SDR to adjust a time (750).

According to a further embodiment of this aspect, method 700 may further include a step of receiving another output signal from the SDR operating in a second state. The method 700 may include yet a further step of determining, based upon the received other output, another delay state of the SDR from the plurality of predetermined delay states of the SDR.

According to even further embodiment of this aspect, method 700 may include a step of generating another calibrated signal based upon the other state. Method 700 may even include a step of transmitting the other calibration signal to the SDR for operating in a third state.

While the systems and methods have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present application includes any and all embodiments of the following claims.

What is claimed is:

1. A method comprising:
   transmitting a stimulus signal to a software defined radio (SDR) operating in a first state;
   receiving, via the SDR, an output signal based upon the transmitted stimulus signal;
   determining, based upon the received output signal, a delay state of the SDR from a plurality of predetermined delay states of the SDR, wherein the delay state includes a range between 12.5 ps/° C. and −3.5 ps/° C., wherein the delay state is associated with a parameter of the SDR, and wherein the parameter includes any one or more of a receive frequency, transmit frequency or bandwidth;
   generating a calibrated signal based upon the determined delay state; and
   sending the calibrated signal to the SDR, wherein the calibrated signal causes the SDR to adjust its time and operate in a second state.

2. The method of claim 1, further comprising:
   receiving another output signal from the SDR operating in the second state; and determining, based upon the received other output, another delay state of the SDR from the plurality of predetermined delay states of the SDR.

3. The method of claim 2, further comprising:

generating another calibrated signal based upon the other state; and transmitting the other calibration signal to the SDR for operating in a third state.

4. The method of claim 1, wherein the predetermined delay states are obtained by:

collecting, prior to the transmitting step, a plurality of signals output from the SDR; and characterizing the parameter for each of the collected signals.

5. The method of claim 1, wherein the stimulus signal includes a radio frequency signal and a pulse per second (PPS) signal.

6. The method of claim 1, wherein the stimulus signal includes a global navigation satellite system (GNSS) waveform.

7. The method of claim 1, where the calibrated signal is a function of an operating temperature of the SDR.

8. The method of claim 1, wherein the calibrated signal is a sub-nanosecond signal measured in picoseconds.

9. A system comprising:

non-transitory memory including instructions stored thereon; and a processor operably coupled to the non-transitory memory, wherein the processor is configured to execute the instructions including:

causing a transmission of a stimulus signal to a software defined radio (SDR) operating in a first state;

causing a reception of an output signal from the SDR based upon the transmitted stimulus signal;

determining, based upon the received output signal, a delay state of the SDR from a plurality of predetermined delay states of the SDR, wherein the delay state is associated with a parameter of the SDR, and wherein the delay state includes a range between 12.5 ps/° C. and −3.5 ps/° C.; and causing to generate a calibrated signal based upon the determined delay state.

10. The system of claim 9, wherein the processor is further configured to execute the instructions of causing to send the calibrated signal to the SDR.

11. The system of claim 9, further comprising:

a signal generator and a clock/calibration module.

12. The system of claim 11, wherein the processor, the signal generator and the clock/calibration module are housed in a single casing.

13. The system of claim 9, wherein the parameter includes any one or more of a receive frequency, transmit frequency or bandwidth.

14. A system comprising a software defined radio (SDR), wherein the SDR is configured to execute a set of instructions including:

sending, while in a first state, an output signal to a remote system, wherein the output signal indicates a delay state associated with a parameter of the SDR, wherein the delay state includes a range between 12.5 ps/° C. and −3.5 ps/° C.;

receiving, from the remote system, a calibrated signal; and updating, based upon the calibrated signal, to a second state from the first state.

15. The system of claim 14, further comprising a satellite encasing the SDR.

16. The system of claim 14, wherein the system operates at a temperature ranging between −20° C. and 50° C.

17. The system of claim 16, wherein an internal pressure of the system is about $10^{-5}$ Torr.

18. The system of claim 14, wherein the parameter includes any one or more of a receive frequency, transmit frequency or bandwidth.

19. The system of claim 14, where the calibrated signal is a function of an operating temperature of the SDR.

\* \* \* \* \*